UNITED STATES PATENT OFFICE.

HERBERT J. KEITH, OF SOMERVILLE, MASSACHUSETTS, ASSIGNOR TO H. J. KEITH COMPANY, OF BOSTON, MASSACHUSETTS, A CORPORATION OF MASSACHUSETTS.

PRESERVING EGGS.

1,119,964.  Specification of Letters Patent.  Patented Dec. 8, 1914.

No Drawing.  Application filed April 8, 1913, Serial No. 759,801.  Renewed May 1, 1914.  Serial No. 835,776.

*To all whom it may concern:*

Be it known that I, HERBERT J. KEITH, a citizen of the United States, and resident of Somerville, in the county of Middlesex and State of Massachusetts, have invented certain new and useful Improvements in Preserving Eggs, of which the following is a specification.

This invention has relation to the preservation of poultry eggs.

As pointed out in Letters Patent No. 955,835 to Herbert J. Keith and Simeon C. Keith, Jr., dated April 19, 1910, when eggs have been removed from the shells and frozen at a low temperature they may be kept for practically an unlimited time, but, when they are thawed, the yolk of the egg does not possess its initial physical characteristics and the mass separates into a thick gelatinous substance and a watery substance. It was further pointed out in said patent that this separation of the egg could be prevented by the addition thereto, prior to the freezing, of sugar or its equivalent, in practice sugar to the amount of 5% to 25% by weight being added to the egg. When egg has been treated as described in said patent, that is, when sugar has been added either to the yolk or to a batter formed of the whole egg and then frozen at a low temperature, it will possess when thawed the initial physical characteristics of the egg. Some difficulty, however, has been experienced with egg treated as described in which from 5% to 25% of sugar is used, for the reason that the thawed egg is sweet to the taste, and consequently, when it is used by bakers, it is necessary for the latter to change their receipts to compensate for the sugar. It is desirable that the frozen egg should not possess this marked sweet taste, especially where it is used for omelets, etc. When a smaller quantity of sugar is used, so that it cannot be tasted, it does not have the effect of fully preserving the physical characteristics of the egg. Common table salt alone if used in sufficient quantities will effect the preservation of the egg, but the proportion or amount necessary renders the egg so saline in taste as to prevent its use for certain purposes in cooking. I have discovered that by using small or minute quantities of both sugar and salt, I am able to prevent more or less the permanent thickening and physical change of the yolk, without imparting to the egg any marked flavor of either the salt or the sugar. While I do not limit myself to the exact proportions or quantities, I employ approximately one (1%) per cent. of fine granulated cane sugar and one seventh of one per cent. (.14+%) of pulverized table salt (by weight) to the batter of whole egg, or separated yolks, prior to the subjection of the egg to the low temperature (preferably approximately zero degress Fahrenheit) which prevents bacteriological decomposition thereof. When these relatively minute quantities of the two ingredients are added prior to the freezing of the egg, the egg substance, when thawed, resembles that of the natural fresh egg in its useful physical characteristics, and may be put to any use for which the fresh egg is applicable without having any markedly noticeable foreign flavor. The egg is maintained in its frozen condition until it is to be used, and is then slowly thawed.

Having thus explained the nature of my said invention and described a way of making and using the same, although without attempting to set forth all of the forms in which it may be made or all of the modes of its use, what I claim is:

1. The method of preserving egg which consists in adding thereto minute quantities of sugar and salt, and freezing the mixture below the temperature of decomposition, until ready for use, the amount of sugar and salt being sufficient to substantially prevent permanent thickening and physical modification of the egg substance when thawed without imparting a markedly noticeable foreign flavor thereto.

2. As a new article of manufacture, egg containing added minute quantities of both sugar and salt and frozen below the temperature of decomposition, the amount of added sugar and salt being sufficient to substantially prevent permanent thickening and physical modification of the egg substance when thawed, without imparting a markedly noticeable foreign flavor thereto.

In testimony whereof I have affixed my signature, in presence of two witnesses.

HERBERT J. KEITH.

Witnesses:
MARCUS B. MAY,
P. W. PEZZETTI.